G. D. GALLAGHER.

BLADE SHARPENING DEVICE.

APPLICATION FILED JAN. 11, 1921.

Reissued Dec. 20, 1921. 15,250.

2 SHEETS—SHEET 1.

Inventor

George D. Gallagher

By

Sturtevant & Mason Attorneys

G. D. GALLAGHER.

BLADE SHARPENING DEVICE.

APPLICATION FILED JAN. 11, 1921.

Reissued Dec. 20, 1921. 15,250.

2 SHEETS—SHEET 2.

Inventor

George D. Gallagher

By

Sturtevant & Mason Attorneys

UNITED STATES PATENT OFFICE.

GEORGE D. GALLAGHER, OF NEW HAVEN, CONNECTICUT, ASSIGNOR, BY DIRECT AND MESNE ASSIGNMENTS, OF TWENTY-FIVE ONE HUNDRED AND FOURTHS TO NANNIE T. HOOS, TWENTY-FIVE ONE HUNDRED AND FOURTHS TO RUTH B. WALTEN, FOUR ONE HUNDRED AND FOURTHS TO MARGUERITE G. SCHANBERGER, AND TWENTY-FIVE ONE HUNDRED AND FOURTHS TO MABEL E. MOHR, ALL OF BALTIMORE, MARYLAND, AND TWENTY-FIVE ONE HUNDRED AND FOURTHS TO CALLIE F. MOORE, OF WASHINGTON, DISTRICT OF COLUMBIA.

BLADE-SHARPENING DEVICE.

15,250. Specification of Reissued Letters Patent. Reissued Dec. 20, 1921.

Original No. 1,319,149, dated October 21, 1919, Serial No. 132,425, filed November 20, 1916. Renewed December 30, 1918, Serial No. 268,877. Application for reissue filed January 11, 1921. Serial No. 436,572.

*To all whom it may concern:*

Be it known that I, GEORGE D. GALLAGHER, a citizen of the United States, residing at New Haven, in the county of New Haven, State of Connecticut, have invented certain new and useful Improvements in Blade-Sharpening Devices, of which the following is a description, reference being had to the accompanying drawing and to the figures of reference marked thereon:

This invention relates to devices for stropping safety razor blades, and more particularly to such devices operable by hand.

One of the objects of the present invention is to provide a device of the character described adapted especially for stropping safety razor blades which will provide a uniform sharpening of the blade by a simple manual operation requiring no special skill on the part of the operator.

One of the main objects of this invention is to provide a device including stropping means and a blade holder shiftable so as to present first one side and then the other of the blade to the stropping means and positively interconnected coöperating devices for rotating said stropping means during its contact with the blade.

Another object of this invention consists in providing a device of the character described comprising two relatively reciprocable members including rotatable stropping means and a blade holder, with devices intermediate said reciprocable members and coöperating therewith so that relative reciprocation of said members automatically rotates said stropping means and also shifts said blade into a position to be sharpened.

Still another object of this invention resides in providing a device of the character described including stropping means and a blade holder, and devices for rotating said stropping means, first in one direction and then in the other, and for automatically positioning the blade into engagement with the stropping means, said devices being constructed and arranged so that the pressure of the blade against the stropping means may be varied by varying the pressure on the means for rotating the stropping means.

A further feature of this invention consists in providing a device of the above character including two relatively movable members having stropping means and a holder for the blade wherein the means intermediate said relatively movable members is constructed and arranged so that on relative movement of said members, said blade is shifted into contact with the stropping means to thereafter cause the rotation of said stropping means by the relative movement of said members.

Another phase of the invention resides in providing a device including a support carrying stropping means and a blade holder, and a member reciprocable with respect to said support and devices actuated thereby including means constructed and arranged to move with said member to position the blade to be stropped and to move relatively to said member to rotate said rolls.

Yet another desirable feature of this invention resides in providing a device including a support having mounted thereon stropping means and a blade holder, together with spiral means reciprocable relative to said support for rotating said stropping means and for automatically positioning the blade with respect thereto.

Another phase of this invention resides in providing a support carrying stropping means and a blade holder, together with spiral means reciprocable relatively to said support for rotating the same, and further spiral means for automatically positioning the blade with respect to the stropping means.

These and other objects will in part be obvious and will in part be hereinafter more fully disclosed.

The invention is shown by way of illustration in the accompanying drawings, wherein—

Figure 5:
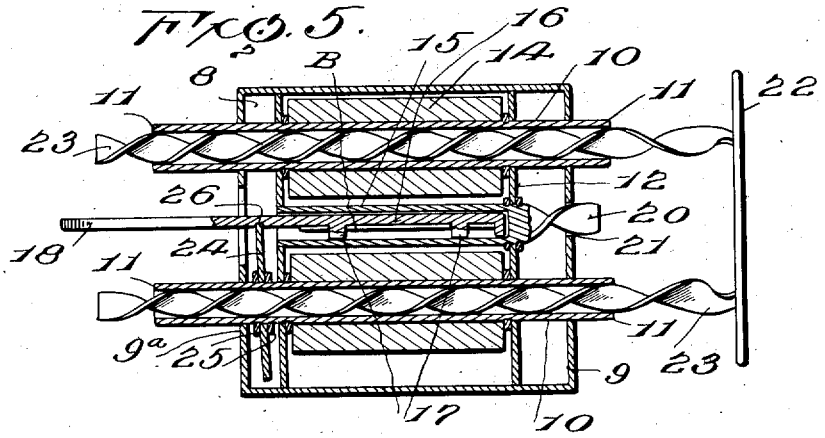
Fig. 5 is a horizontal sectional view of the device.
Figure 6:
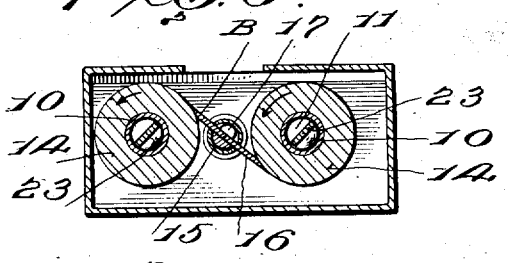
Fig. 6 is a transverse sectional view thereof.

Referring more particularly to the accompanying drawings, the device includes a suitable supporting means or support 8, preferably constructed with angular and relatively parallel portions 9 and 9ª which are apertured to receive a pair of tubular spindles 10 which have rotation and reciprocation therein, and whose reciprocatory movements are effected and controlled by a simple operation of the hand. (See Figs. 1 and 5.)

A frame or basket comprising a metal strip 12 having angular and relatively parallel portions 13 and 13ª is mounted on the pair of spindles to reciprocate therewith to allow said spindles freedom of rotation. The device is also provided with stropping means, in the present instance, consisting of two sharpening or stropping rollers 14, each mounted on one of said spindles within the frame, as shown.

Figure 1:
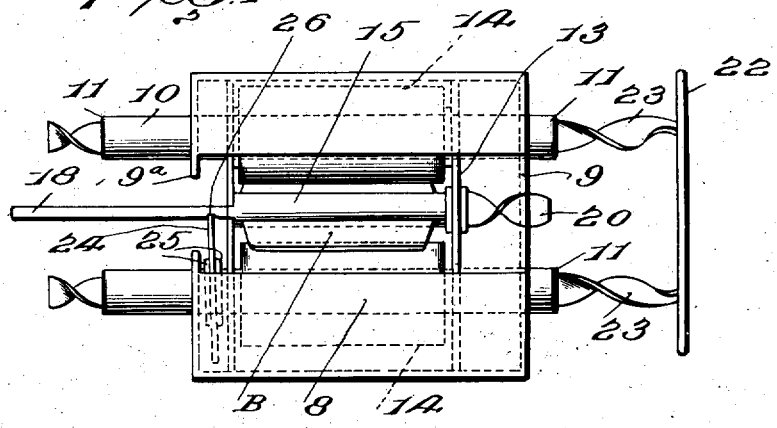
Figure 1 is a top plan view of the device.
Figure 2:
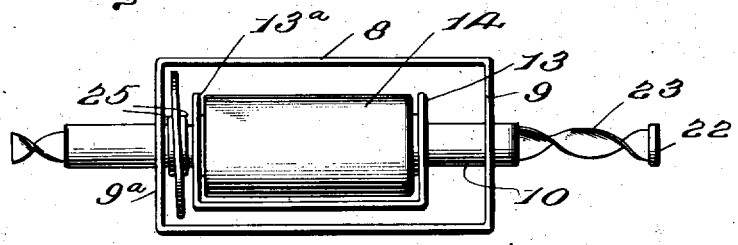
Fig. 2 is a side elevation thereof with the casing in section.
Figure 3:
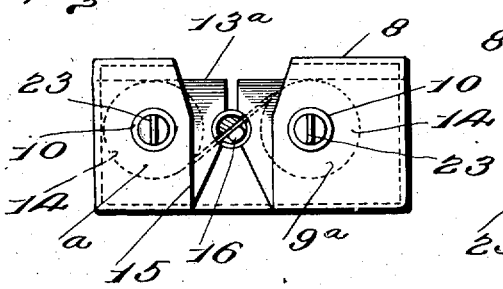
Fig. 3 is an end elevation.
Figure 4:
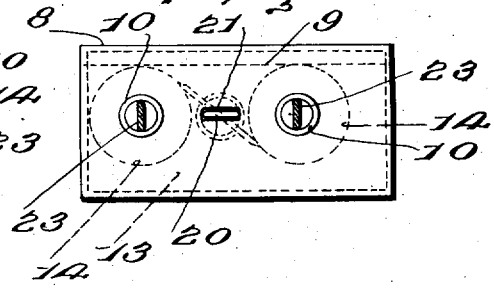
Fig. 4 is a similar view from the other end.

Also shiftably arranged on the support or supporting means 8 is a blade holding means, which in the present instance, is mounted to oscillate in the frame and consists of a split or double slotted tube 15 suitably journaled in the side portions 13 and 13ª of the frame 12, the slots of said tube being adapted to receive a blade B which is held on the blade holding member 16 formed with a pair of studs 17 which engage in the slots or apertures formed in the ordinary blades of safety razors. The outer end of the blade holding member 16 is formed with a hand gripping piece 18 for inserting the blade into the tube 15 by removing the same, and for which purpose the end 13ª of the frame and the end 9ª of the support are cut away as shown in Figs. 1 and 3.

In lieu of the blade holder, here shown, any other type of holding device may be employed, *e. g.*, a suitable piece for holding the back of the ordinary razor blade.

The blade holder is adapted to be automatically shifted for alternately presenting the opposite sides of the blade to the stropping means or rolls, and to this end the blade holding member 15 is provided with an extended spiral portion 20 preferably of different pitch from the pitch of the spiral members 23. This spiral portion is preferably relatively flat in cross section and works within the slot 21 formed within the portion 9 of the supporting member 8. It will, therefore be obvious that any relative movement of said support and the frame 12 will impart oscillation to the blade holder.

In order to operate the device, there is arranged a driver or member 22 which reciprocates relatively to the support 8 and in a plane parallel to the axis of the stropping means carried by said support. This driver or member 22 comprises in its present form, a pair of rods 23 which are formed spirally and pass through the pair of spindles 10 and engage therewith so that the reciprocation of said member 22 will cause the spindles to be simultaneously and uniformly rotated in the same direction. The engaging elements between the spiral members 23 and the spindles consist of suitable slots or apertures formed in the end portions 11 through which the rods 23 pass, or any other suitably formed devices for accomplishing this purpose may be employed.

Figure 7:
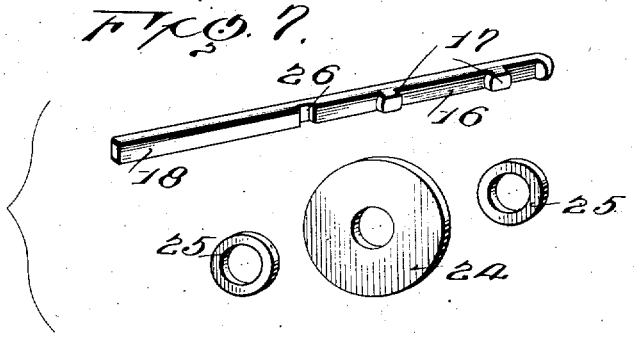
Fig. 7 is a detail view of the blade holder and securing device therefor.

The blade holder may be held against accidental displacement during the sharpening operation by means of a device consisting of a disk or plate 24 firmly mounted on one of the spindles 10 by a pair of rings 25. Said disk is disposed slightly diagonally and engages within a notch 26 formed circumferentially or partly circumferentially in the blade holder B as shown in Figs. 1 and 7, so that as the disk is rotated through the spindle on which it is mounted, a slight reciprocatory movement is given the blade holder and blade. This operation assists in the stropping or sharpening action. The engagement between said member and blade holder is located at a virtual point which allows the blade to be oscillated without binding or other interference.

In the operation of the present device, a single or double edged blade is inserted in the blade holder after the manner stated and the reciprocable member 22 is given a movement toward the support 8. Due to the fact that the rolls offer greater resistance against rotation than the blade holder does against shifting, it is evident that when the reciprocable member 22 is moved toward the support 8, the spiral rods 23 instead of immediately rotating the spindles 10 with the rolls thereon, will cause the spindles and the frame carrying the rolls to move laterally or axially, that is, bodily with the spiral rods, which lateral movement of the frame 12 likewise moves with it axially the spiral 20, and by reason of its engagement with the slot 21, will cause the blade holder with its blade to shift or oscillate to present the blade edge properly against the stropping means. The spiral member 20 is preferably given a quicker pitch than the rods 23, as clearly shown in Figs. 1 and 5, so that the blade will be completely shifted into contact with the rolls during the axial displacement of the stropping rolls. The contacting of this blade edge against the stropping means acts as an abutment to prevent further axial movement of the spindles which thus being incapable of further lateral movement, by reason of the continued movement of the spiral rods 23 and their engagement with the suitable slots formed in the end portins 11, rotation will now be imparted to the stropping rolls. This relative rotation between the stropping rolls and the bodily movable spiral rods 23 is continued until the reciprocable spiral member reaches its innermost position. Upon reversal of direction of this spiral member, and due to the same reasons as before recited, the spindles, together with the frame and rolls carried thereby, will be given a lateral movement in a reverse direction, which in turn will move the spiral 20 backwardly through the slot 21 and will reverse the direction of the blade and position the same properly against the stropping means. This blade again abutting against the stropping means, prevents further lateral movement of the spindles, the frame and stropping rolls, so that the spiral rods 23 will now cause the stropping rolls to rotate as before, but in a reverse direction.

It must be also evident that the present device does away with the usual geared connection between the hand operated member and the stropping rolls and work holder and the customary friction clutch connection which permits the blade to be pressed against the roll during the rotation of the latter. The present invention makes use of positively inter-connected coöperating devices for accomplishing this function which connection comprises the spiral elements and their coöperating parts.

It will thus be seen that the application for positioning of the blade against the roll is under the direct control of the operator when he applies pressure on the reciprocable member 22, either in its motion toward or away from the support 9. By means of this construction, the operator can increase or decrease the pressure of the blade on the stropping surface to provide a heavy or light stropping effect, as desired.

It is obvious that those skilled in the art may vary the details of construction and the arrangement of parts without departing from the spirit of my invention, and therefore I do not wish to be limited to such features, except as may be required by the claims.

Having thus described the invention, what I claim as new and desire to secure by Letters-Patent, is—

1. A device of the class described comprising an inclosing casing adapted to be held in the hand, stropping means and a shiftable blade holder mounted therein, rigid hand-held driving means reciprocable into and out of said casing, and devices connected to said stropping means and blade holder and actuated by the reciprocation of said driving means for operating said stropping means and for automatically positioning the blade holder.

2. A device of the class described comprising a supporting casing, a stropping roll and a blade holder mounted thereon, a hand operated driver reciprocable relatively to said support in a plane parallel with the axis of said stropping roll, and devices actuated by the reciprocation of said driver and connected to said stropping roll and blade holder for actuating said roll and for automatically positioning the blade relatively thereto.

3. A device of the class described comprising an inclosing casing, stropping rolls and a blade holder mounted therein, a hand operated driver reciprocable within and without said casing in a plane parallel with the axes of said stropping rolls, and devices actuated by the reciprocation of said driver and connected to said stropping rolls and blade holder for actuating said rolls and for automatically positioning the blade relative thereto.

4. A device of the class described comprising rigid members interconnected to reciprocate relatively in a plane parallel with the longitudinal axes of said members, stropping means and a blade holder carried by at least one of said members, and devices operatively connected to said stropping means and blade holder and actuated by the relative reciprocation of said members for rotating said stropping means and positioning the blade.

5. A device of the class described comprising an inclosing casing adapted to fit within the palm of the hand, stropping means and a blade holder journaled therein, a rigid hand operated driver reciprocable into said casing substantially in the median plane thereof, and devices operatively connected to said stropping means and blade holder constructed and arranged to be operated by the relative movement of said casing and driver for automatically rotating said stropping means and positioning the blade holder.

6. A safety razor blade stropper comprising an inclosing casing, a driver having spirals reciprocating into and out of said casing, tubular sleeves freely journaled in the ends of said casing for rotation and endwise movement, said sleeves surrounding said spirals and making driving connection therewith for causing said sleeves to move endwise and to rotate, stropping rolls mounted on said sleeves, a blade holder, and means for shifting said blade holder on the endwise shifting of said sleeves by said spirals.

7. In a blade sharpening device, the combination of a support, stropping means and a blade holder journaled on said support, a spiral driver operatively connected to said stropping means for rotating the same, devices connected to said blade holder and actuated by said driver for shifting said blade holder, said devices including a spiral member having a different pitch than said spiral driver.

8. A device of the class described comprising a support, stropping means and a blade holder mounted thereon, a driver, means for operating said blade holder from said driver by a predetermined pressure on said driver to cause said blade to shift into contact with said stropping means, said means including a driving connection normally inoperative at said pressure, but operable on an increase of pressure on said driver for operating said stropping means.

9. A device of the class described comprising a supporting casing, stropping means and a blade holder mounted thereon, a rigid driver, means operated by said driver for shifting the blade into contact with said stropping means, said means including a driving connection between said driver and stropping means adapted to operate said stropping means upon contact of said blade with said stropping means.

10. In a device of the class described, an inclosing casing, hollow sleeves journaled in said casing, an inner basket or support on said sleeves and reciprocable in said casing, stropping rolls arranged in said basket and operatively connected to said sleeves, a blade holder in said casing between said rolls and having a spiral portion engaging a part held from rotation, and a driver having spiral portions reciprocable through said sleeves for rotating said rolls and reciprocating said basket to position the blade holder.

11. In a blade sharpening device, a casing, a tubular spindle mounted therein for limited axial displacement, a stropping roll on said spindle, a spiral bar reciprocably engaging within said tubular spindle, a blade holder mounted on said casing, and devices coöperating with said tubular spindle and blade holder whereby initial movement of said spiral bar causes axial displacement of the tubular spindle and then commences to rotate it, said devices acting to shift the blade holder during said axial displacement of said tubular spindle.

12. A device of the class described comprising an inclosing casing, a driver reciprocable into and out of said casing, a stropping means and a blade holder, means actuated by said driver for rotating said stropping means and shifting said blade holder, said means including a shiftable tubular sleeve operatively connected with said blade holder and surrounding said driver and making driving contact therewith.

13. In a blade sharpening device, supporting means, stropping means and a blade holder carried thereby, a driver reciprocable with respect to said support, and devices operatively connected to said stropping means and blade holder and operated by said driver, said devices including an operating member operatively connected with said driver to move bodily therewith to cause through said devices, the positioning of the blade holder and to move relatively to said driver to permit through said devices the operation of the stropping means.

14. In a blade sharpening device, a support, stropping means rotatably journaled thereon, a blade holder arranged thereon, spiral means reciprocable relatively to said support, and devices operatively connected to said stropping means and blade holder, and actuated by the reciprocation of said spiral means for rotating said stropping means and for automatically positioning the blade with respect thereto.

15. A safety razor blade stropper comprising a support, two hollow stropping rolls and a blade holder journaled in spaced relation thereon, a driver comprising a handle having two parallel spirals telescopingly reciprocable through said rolls, and devices operatively interconnecting said rolls, blade holder and spirals for rotating said rolls first in one direction and then in the other and for automatically positioning the blade with respect thereto on relative reciprocation of said casing and handle.

16. In a blade sharpening device, an inclosing casing, stropping means and a blade holder arranged therein, a rigid driving member reciprocable into and out of said casing, and devices operated by said driving member and connected to said stropping means and blade holder for operating said stropping means and for applying the blade thereto with variant pressure.

17. In a blade sharpening device, the combination of a support, stropping means and a blade holder journaled on said support, a spiral driver reciprocable relatively to said support, and operatively connected to said stropping means for rotating the same, devices connected to said blade holder and actuated by said spiral driver for shifting said blade, said devices including a spiral member and means to actuate said spiral member.

18. In a blade sharpening device, the combination of a casing, stropping rolls journaled therein, a blade holder arranged in said casing to receive the blade, reciprocable spiral means operatively connected to said rolls to rotate said rolls, and spiral means operatively connected to said first spiral means and to said blade holder and engaging a part held from rotation for automatically positioning the blade with respect to said stropping rolls.

19. In a device of the character described, supporting means, stropping means and a blade holder journaled in spaced relation thereon and having their axes fixed against lateral displacement, hand-operated means for rotating the stropping means and for shifting the blade into position to be stropped, said means including devices whereby a variable pressure applied by the hand of the operator on the means for rotating the stropping means will produce a varying pressure of the blade against the stropping means.

20. In a blade sharpening device, the combination of a support, an abrading roller journaled in said support, a blade holder mounted to oscillate, a reciprocable spiral member engaging with said roller for imparting rotation thereto, and means on the blade holder engaging with said support to automatically position the opposite sides of the blade with respect to said roller, substantially as set forth.

21. In a blade sharpening device, the combination of a support, an abrading roller journaled in said support, a blade holder mounted to oscillate, a member on the blade holder engaging with the support for automatically imparting periodic oscillation to said blade holder, and reciprocable spiral means engaging with the roller for imparting rotation and reciprocation thereto and actuating the blade holder moving device to position the opposite sides of the blade edge with respect to said roller, substantially as set forth.

22. In a blade sharpening device, the combination of a support, an abrading roller journaled in said support, a blade holder mounted to oscillate, a member for automatically imparting periodic oscillation to said blade holder, and a reciprocable spiral member engaging with said roller for imparting rotation thereto and actuating the blade holder moving device to position the opposite sides of the blade edge with respect to said roller, substantially as set forth.

23. In a blade sharpening device, the combination of a support, an abrading roller journaled on said support, a reciprocable member mounted in the support, a blade holder mounted to oscillate on the reciprocable member and having a spiral portion engaging the support, and a reciprocable spiral member engaging with said roller for imparting rotation thereto and automatically actuating the blade holder moving device to position the opposite sides of the blade edge with respect to said roller, substantially as set forth.

24. In a blade sharpening device, the combination of a support, a spindle mounted to rotate and reciprocate on said support, an abrading roller mounted on said spindle, a member mounted to reciprocate with the spindle, a blade holder mounted to oscillate on said reciprocable member and having a spiral portion engaging with said support to automatically actuate said holder to position the blade edge with respect to said roller, and a member engaging with said spindle for imparting rotation and reciprocation thereto, substantially as set forth.

25. In a blade sharpening device, the combination of a support, a spindle mounted to rotate and reciprocate on said support, a frame mounted on the spindle, an abrading roller mounted on said spindle within the frame, a blade holder mounted to oscillate on said frame and having a spiral portion engaging with the support to automatically oscillate said holder to position the blade edge with respect to said roller, and a spiral member engaging with said spindle for imparting rotation and reciprocation thereto, substantially as set forth.

26. In a blade sharpening device, the combination of a support, a pair of spindles mounted to rotate and reciprocate on said support, a frame mounted on the spindles, a pair of abrading rollers mounted on said spindles within said frame, a blade holder mounted to oscillate on the frame and having a spiral portion engaging with said support to automatically position the blade edge with respect to the rollers, and a pair of spiral members engaging with said spindles respectively to impart rotation to said rollers and reciprocation to the frames, substantially as set forth.

27. In a device for sharpening double-edged blades, the combination of a support, a pair of spindles mounted to rotate and reciprocate on said support, a frame mounted on said spindles, a pair of abrading rollers mounted on the spindles within said frame, a blade holder mounted to oscillate on the frame and having a spiral portion engaging with said support to automatically position the blade edges with respect to said rollers, and a device having engagement with said spindles to impart rotation to the rollers and reciprocation to the frame, substantially as set forth.

28. In a blade sharpening device, the combination of a support, a spindle mounted to rotate and reciprocate on said support, a frame mounted on said spindle, an abrading roller mounted on the spindle within the frame, a blade holder mounted in said frame and connected to be oscillated from the support, a device mounted on the spindle and engaging with said blade holder to hold the same against displacement during operation, and means for imparting rotation to the roller and reciprocation to said frame to position the opposite sides of the blade edge with respect to said roller, substantially as set forth.

29. In a blade sharpening device, the combination of a support, a pair of spindles mounted to rotate and reciprocate on said support, a frame mounted on the spindles, a pair of abrading rollers mounted on the spindles within said frame, a blade holder mounted to oscillate on the frame and having a spiral portion engaging with said support, a device on one of said spindles engaging with the blade holder to hold the same against displacement during the operation, and means for imparting rotation to the rollers and reciprocation to the frame to position the opposite sides of the blade edges with respect to said roller, substantially as set forth.

In testimony whereof, I affix my signature.

GEORGE D. GALLAGHER.